(12) United States Patent
Suzuki et al.

(10) Patent No.: US 9,601,935 B2
(45) Date of Patent: Mar. 21, 2017

(54) ELECTRONIC APPARATUS

(71) Applicant: FUJITSU LIMITED, Kawasaki-shi, Kanagawa (JP)

(72) Inventors: Kenji Suzuki, Kawasaki (JP); Daisuke Mihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/983,462

(22) Filed: Dec. 29, 2015

(65) Prior Publication Data

US 2016/0204635 A1 Jul. 14, 2016

(30) Foreign Application Priority Data

Jan. 13, 2015 (JP) .................... 2015-004478

(51) Int. Cl.
| | |
|---|---|
| *H05K 5/00* | (2006.01) |
| *H05K 7/00* | (2006.01) |
| *H02J 7/00* | (2006.01) |
| *G06F 1/16* | (2006.01) |

(52) U.S. Cl.
CPC .......... *H02J 7/0044* (2013.01); *G06F 1/1626* (2013.01); *G06F 1/1632* (2013.01); *G06F 1/1654* (2013.01)

(58) Field of Classification Search
CPC ............ G06F 1/16; G06F 1/1669; H05K 5/00
USPC .................................... 361/679.41
See application file for complete search history.

(56) References Cited

U.S. PATENT DOCUMENTS

| | | | |
|---|---|---|---|
| 2008/0024966 A1* | 1/2008 | Huang .................. | G06F 1/1626 361/679.06 |
| 2014/0043743 A1* | 2/2014 | Liang .................... | G06F 1/1669 361/679.09 |

FOREIGN PATENT DOCUMENTS

| | | |
|---|---|---|
| JP | 06-043718 | 6/1994 |
| JP | 2010-200445 | 9/2010 |

* cited by examiner

*Primary Examiner* — Jerry Wu
(74) *Attorney, Agent, or Firm* — Fujitsu Patent Center

(57) ABSTRACT

An electronic apparatus includes: a cradle includes a pedestal, a protrusion portion that protrudes toward a slope direction from an upper portion of the pedestal including a slope surface, and a first connector formed in the pedestal; and a display device include a display portion and a second connector formed on a surface of the display device, wherein, even when a back surface of the display device comes into contact with the slope surface of the protrusion portion and the display device is mounted on the cradle in a vertically placed manner, the first connector is connected to the second connector, and wherein, even when the back surface of the display device comes into contact with the pedestal and the display device is mounted on the cradle in a horizontally placed manner, the first connector is connected to the second connector.

12 Claims, 12 Drawing Sheets

ELECTRONIC APPARATUS

CROSS-REFERENCE TO RELATED APPLICATION

This application is based upon and claims the benefit of priority of the prior Japanese Patent Application No. 2015-004478, filed on Jan. 13, 2015, the entire contents of which are incorporated herein by reference.

FIELD

The embodiment discussed herein is related to an electronic apparatus that is connected to a cradle.

BACKGROUND

Recently, a portable electronic apparatus (called a tablet, and hereinafter, referred to as a tablet) including a touch panel has been widely used. In addition, a cradle having an electrical charging function or a data communication function is practically used, as a holding device in a case in which a tablet is used on a desk. The cradle includes a cradle for vertical placement in which the tablet is used in an obliquely upright state (first posture), and a cradle for horizontal placement in which the tablet is used in a state (second posture) of being laid on a desk.

FIG. 1A illustrates a tablet 91 that is a display device including a displayer 98, and a cradle 92 for vertical placement of the tablet 91, and an electronic apparatus 90 is formed by the tablet 91 and the cradle 92. There is a groove 93 of a U-shaped cross section in the cradle 92, and there are a hook 94 which fixes the tablet 91, and a connector 95 which is fitted to a connector 97 on the tablet side, inside the groove 93. In addition, there are an engagement hole 96 into which the hook 94 in the cradle 92 is inserted, and the connector 97, in one end 91B of the tablet 91. FIG. 1B illustrates the first posture (vertically placed state) in which the tablet 91 is obliquely held in the cradle 92 illustrated in FIG. 1A. In this state, it is possible to perform an input operation, using a touch panel provided in the displayer 98 of the tablet 91.

FIG. 2A illustrates an electronic apparatus 80 including the tablet 91, and a cradle 82 in which the tablet 91 is mounted in the second posture (horizontal placement). There are a hook 84 which fixes the tablet 91, and a connector 85 which is fitted to the connector 97 of the tablet 91, on an upper surface of the cradle 82. In addition, there are an engagement hole into which the hook in the cradle is inserted, and a connector, in the tablet 91.

FIG. 2B illustrates a state (horizontally placed state) in which the tablet 91 is held in an approximately horizontal manner in the cradle 82 illustrated in FIG. 2A. In this state, it is possible to perform an input operation, using a touch panel provided in a displayer (displayer 98 illustrated in FIGS. 1A and 1B) of the tablet 91.

However, in the tablet 91 using a comparative technology which is illustrated in FIGS. 1A and 1B, and FIGS. 2A and 2B, cradles 82 and 92 of two types are prepared in a case in which the tablet 91 is vertically placed, and in a case in which the tablet 91 is horizontally placed, and thereby convenience for use of a device is deteriorated.

The following is a reference document.
[Document 1] Japanese Unexamined Utility Model Registration Application Publication No. 6-43718.

SUMMARY

According to an aspect of the invention, an electronic apparatus includes: a cradle includes a pedestal, a protrusion portion that protrudes toward a slope direction from an upper portion of the pedestal including a slope surface, and a first connector formed in the pedestal; and a display device include a display portion and a second connector formed on a surface of the display device, wherein, even when a back surface of the display device comes into contact with the slope surface of the protrusion portion and the display device is mounted on the cradle in a vertically placed manner, the first connector is connected to the second connector, and wherein, even when the back surface of the display device comes into contact with the pedestal and the display device is mounted on the cradle in a horizontally placed manner, the first connector is connected to the second connector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9B is a circuit diagram according to the first example illustrating a state of terminal switching switches on a cradle side when the proximity sensor provided in the cradle is turned on;

DESCRIPTION OF EMBODIMENT

Hereinafter, embodiments of the present disclosure will be described in detail based on a specific example, using the accompanying drawings.

Figure 4:
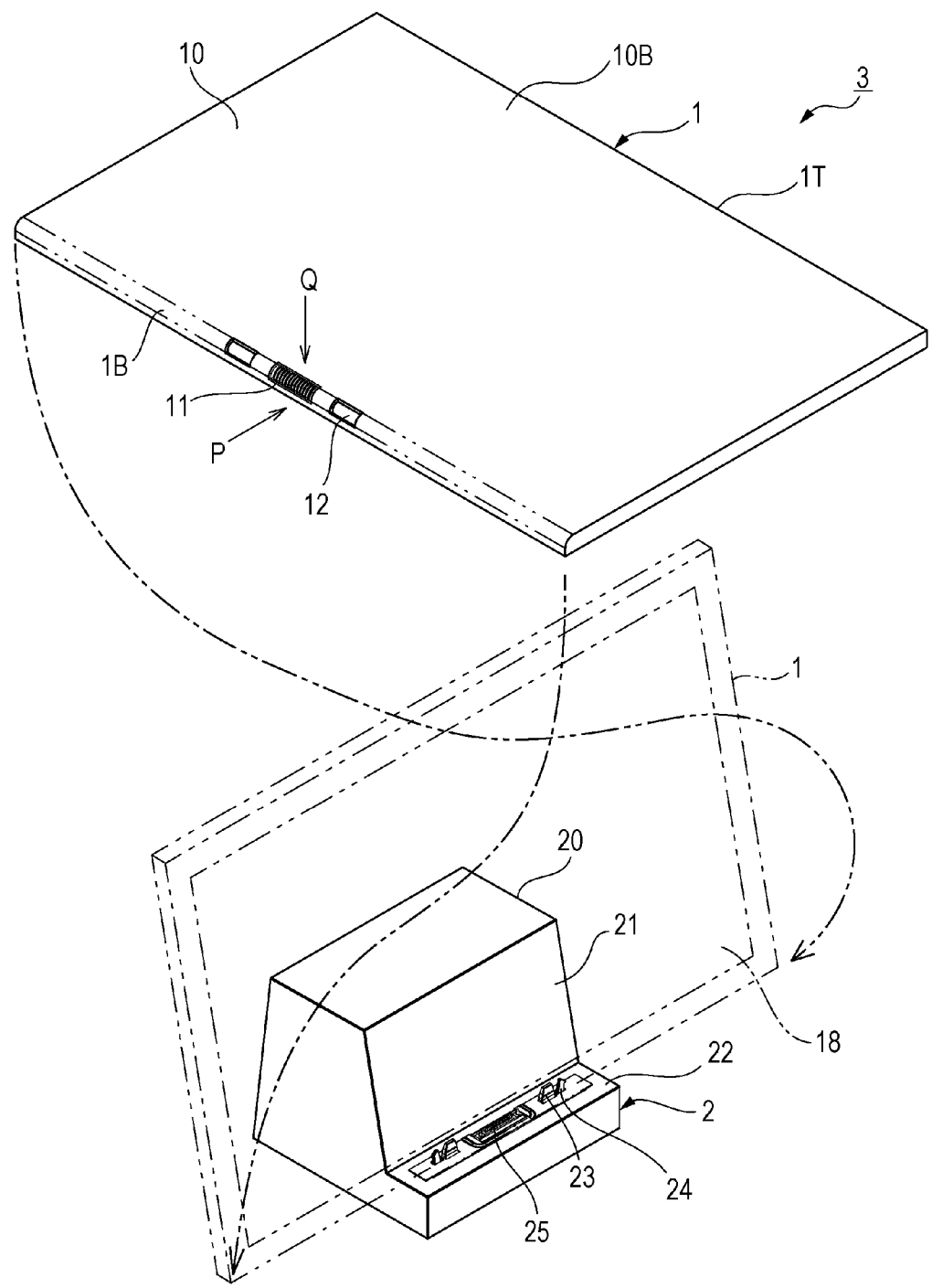
FIG. 4 is a perspective view of an electronic apparatus including a tablet and a cradle according to the present disclosure.
Figure 5A:
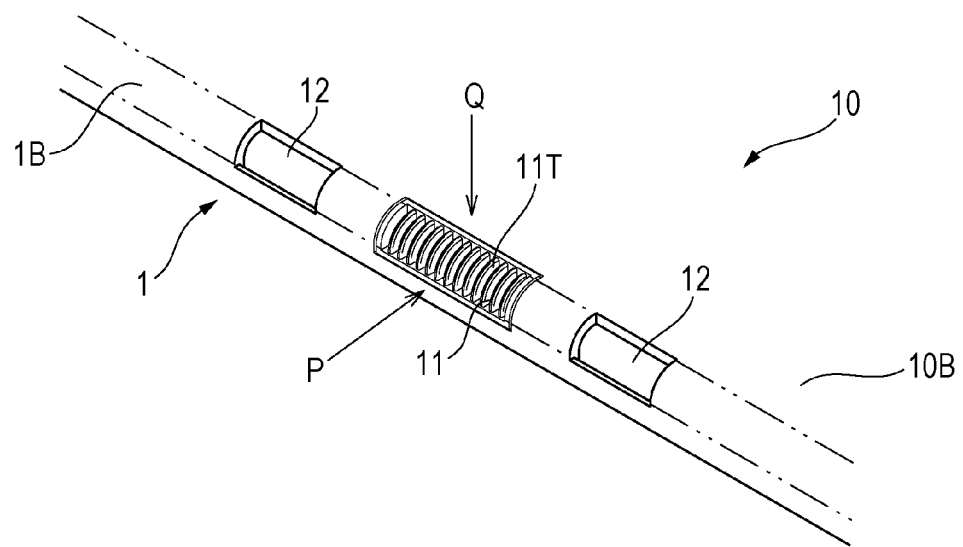
FIG. 5A is a partially enlarged perspective view in which the connectors of the tablet illustrated in FIG. 4 are enlarged.

FIG. 4 illustrates an electronic apparatus 3 of the present disclosure. The electronic apparatus 3 includes a tablet 1 that is a display device to which a displayer 18 is provided, and a cradle 2. In the tablet 1 denoted by a solid line, a back surface 10B which is a rear side of a side from which the displayer 18 is viewed is illustrated. As illustrated in the partially enlarged perspective view of FIG. 5A, a connector 11 is provided in a central portion, and two engagement holes 12 are provided on both sides, in the back surface 10B of a case 10, of the tablet 1 and a side surface 1B in contact with the back surface 10B. The connector 11 is a female connector, a terminal 11T of the connector 11 may be fitted to the male connector in an arrow P direction or to the male connector in an arrow Q direction. That is, the connector 11 may realize a selective connection from both the back surface 10B of the tablet 1 and a side surface 1B in contact with the back surface 10B to the cradle 2. The front side and the rear side of the tablet 1 are reversed from each other from a state being denoted by a solid line, and the tablet 1 is attached to the cradle 2 in a vertical placement state in which the displayer 18 is viewed as denoted by a two-dotted chain line.

Figure 5B:
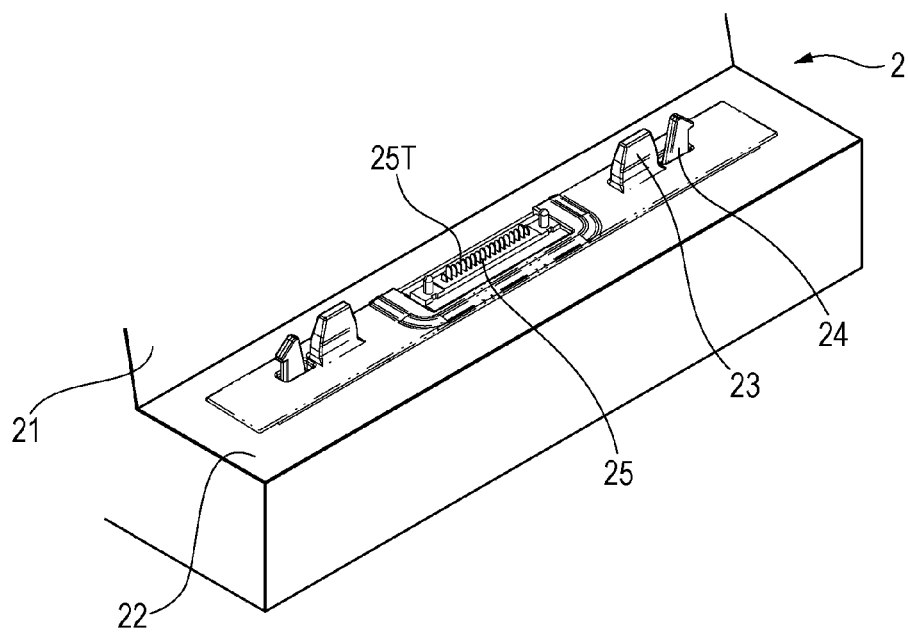
FIG. 5B is a partially enlarged perspective view in which the connectors of the cradle illustrated in FIG. 4 are enlarged.

A case 20 of the cradle 2 includes a protrusion portion 21 having a slope surface to the tablet 1 which is obliquely held, and a pedestal 22 in which the side surface 1B of the tablet 1 is held. In the pedestal 22, a connector 25 is provided in a central portion, and a positioning protrusion 23 and a lock arm 24 are provided on both sides of the connector 25, as illustrated in a partially enlarged perspective view of FIG. 5B. The lock arm 24 may swing in a direction of the positioning protrusion 23. If the connector 11 of the tablet 1 is a female connector, the connector 25 of the cradle 2 is a male connector. The tablet 1 is mounted on the cradle 2 in a state of being denoted by a two-dotted chain line, and in this state the positioning protrusion 23 and the lock arm 24 are inserted into an engagement hole 12 of the tablet 1. In addition, a terminal 25T of 25 is fitted to a terminal 11T of the connector 11 of the tablet 1.

Figure 6A:
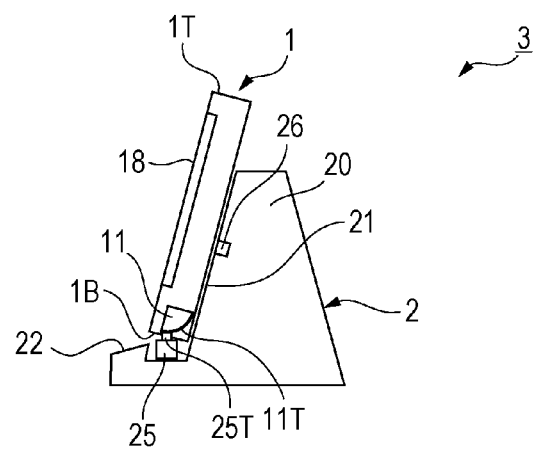
FIG. 6A is a side view illustrating a state in which the tablet is vertically placed in the cradle illustrated in FIG. 4.

FIG. 6A illustrates a state in which the tablet 1 is vertically placed in the cradle 2 illustrated in FIG. 4. The tablet 1 is mounted on the pedestal 22 in such a manner that the displayer 18 of the tablet 1 is positioned on a side opposite to a slope surface which is included in the protrusion portion 21 of the cradle 2 and the connector 11 faces the pedestal 22 of the cradle 2. In addition, in the present example, a proximity sensor 26 is provided on the protrusion portion 21 including the slope of the cradle 2. If the tablet 1 is obliquely mounted on the cradle 2 so as to be held by the protrusion portion 21 including the slope surface of the cradle 2, the proximity sensor 26 is covered by a back surface of the tablet 1, and is turned on, thereby being able to detect vertical placement of the tablet 1. In a state illustrated in FIG. 6A, the side surface 1B including the connector 11 of the tablet 1 becomes a lower side, a side surface 1T on an opposite side becomes an upper side, and the terminal 11T of the connector 11 is fitted to the terminal 25T of the connector 25.

Figure 6B:
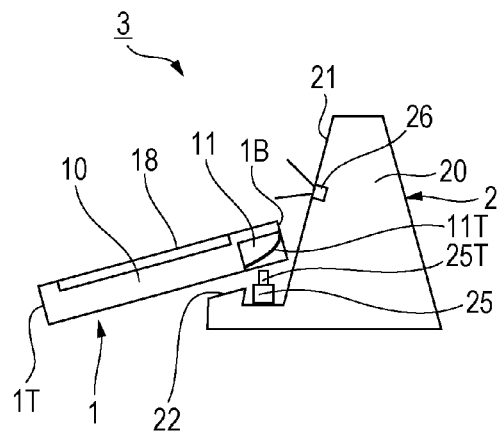
FIG. 6B is a side view illustrating a state shortly before the tablet is horizontally placed in the cradle illustrated in FIG. 4.
Figure 6C:
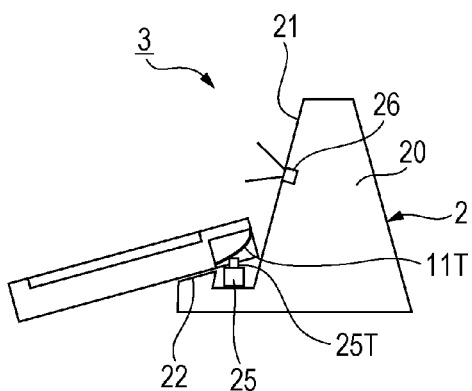
FIG. 6C is a side view illustrating a state in which the tablet is horizontally placed in the cradle illustrated in FIG. 4.

FIG. 6B illustrates a state shortly before the tablet 1 is horizontally placed in the cradle 2 illustrated in FIG. 4, and FIG. 6C illustrates a state in which the tablet 1 is horizontally placed in the cradle 2 for being connected, from the state illustrated in FIG. 6B. If the tablet 1 is horizontally placed in the cradle 2, the side surface 1B including the connector 11 of the tablet 1 becomes an upper side, and the side surface 1T on the opposite side becomes a lower side. In a state in which the back surface of the tablet 1 is mounted on the pedestal 22 of the cradle 2, the terminal 11T of the connector 11 is fitted to the terminal 25T of the connector 25. In a state in which the terminal 11T of the connector 11 is mounted on the terminal 25T of the connector 25, the tablet 1 is not placed on the front surface of the proximity sensor 26, and thus the proximity sensor 26 is turned off, and thus it is possible to detect vertical placement of the tablet 1.

In a case in which the tablet 1 is attached to the cradle 2 in a state of being vertically placed as illustrated in FIG. 6A, and in a case in which the tablet 1 is attached to the cradle 2 in a state of being horizontally placed as illustrated in FIG. 6C, display directions of the displayer 18 are reversed from each other. Thus, in a case in which the tablet 1 is vertically placed in the cradle 2, and in a case in which the tablet 1 is horizontally placed in the cradle 2, the left and the right of the terminal 11T of the connector 11 of the tablet 1 are reversed from each other with respect to the terminal 25T of the connector 25 of the cradle 2.

Figure 7A:
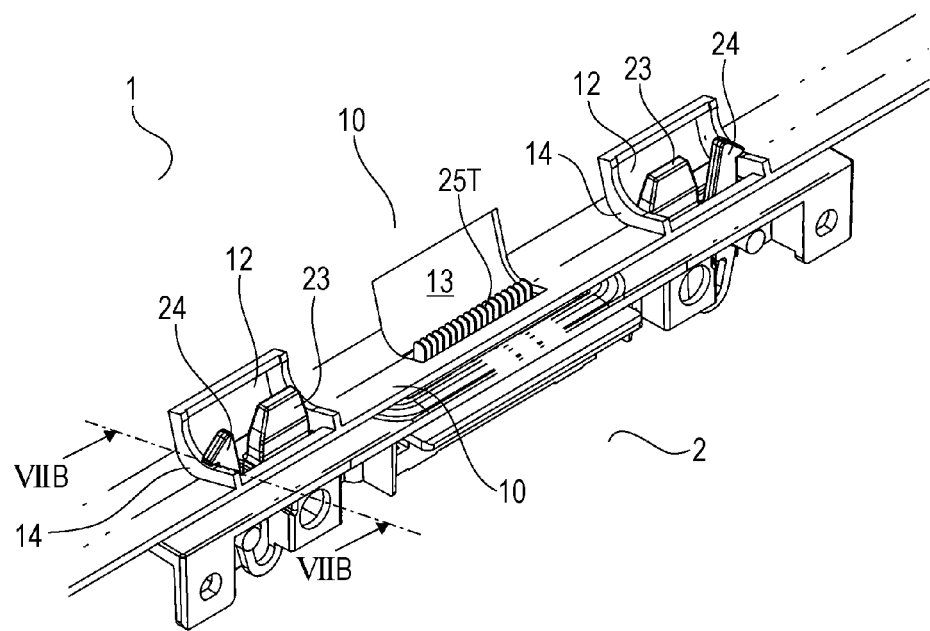
FIG. 7A is a partially enlarged and exploded perspective view which is obtained by viewing a state of the connectors when the tablet is vertically placed in the cradle illustrated in FIG. 4, from an internal side of a case of the tablet.
Figure 7B:
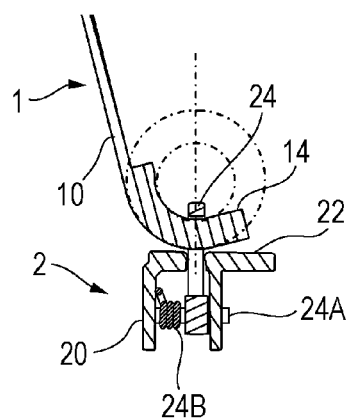
FIG. 7B is a sectional view taken along line VIIB-VIIB of FIG. 7A.

FIG. 7A is a figure which is obtained by viewing the positioning protrusion 23 of the cradle 2, the lock arm 24, and the terminal 25T from an internal side of the case 10 of the tablet 1, when the tablet 1 is vertically placed in the cradle 2 illustrated in FIG. 4. In addition, FIG. 7B illustrates a cross section taken along line VIIB-VIIB of FIG. 7A. In the tablet 1, only a state in which the engagement holes 12 and a connector hole 13 of the case 10 are viewed from an internal side is illustrated, and connectors in the tablet 1 are not illustrated.

In a case in which the tablet 1 is vertically placed in the cradle 2, the highest two positioning protrusions 23 are inserted into the engagement holes 12 of the tablet 1. In this example, an engagement wall 14 is formed in an edge portion of the engagement hole 12. Since the positioning protrusion 23 is formed in a tapered manner, the positioning protrusion 23 is inserted into the engagement holes 12 even though a position of the engagement holes 12 is slightly shifted. If the tablet 1 approaches the cradle 2, the tablet 1 moves along a tapered portion of the positioning protrusion 23, the shifted position is corrected, and a position of the tablet 1 is determined with respect to the cradle 2. Thereafter, the positioning protrusion 23 is inserted into the engagement holes 12 along the engagement wall 14, and subsequently, the terminal 25T of the cradle 2 is inserted into the connector hole 13 which is correctly positioned.

Meanwhile, since a slope surface of the tip of the lock arm 24 in the cradle 2 is positioned in a more outward side than an edge portion of the engagement holes 12 which is correctly positioned, the tip portion of the lock arm 24 comes into contact with the edge portion of the engagement holes 12 while the positioning protrusion 23 is inserted into the engagement holes 12. A base portion of the lock arm 24 is axially supported over the case 20 of the cradle 2 by a rotary axis 24A as illustrated in FIG. 7B, and the lock arm 24 is biased in a direction of being separated from the positioning protrusion 23 by a spring 24B which is wound in the rotary axis 24A. While not illustrated, rotation of the lock arm 24 is stopped by a stopper at a certain position. The position is a position in which the slope surface of the tip of the lock arm 24 comes into contact with the edge portion of the engagement holes 12 of the cradle 2, when the tablet 1 is combined with the cradle 2, as described above.

In addition, an outer surface of a portion in which the engagement holes 12 and the connector hole 13 of the case 10 of the tablet 1 are provided, has an arc shape. In addition, a top surface of the engagement wall 14 in the edge portion of the engagement holes 12 is formed in a circle having the same center as the outer surface of the arc shape of the tablet 1. Thus, distances from an outer surface of an arc shape of the tablet 1 to the top surface of the engagement wall 14 are equal to each other, even in a case in which the tablet 1 is vertically placed in the cradle 2, or even in a case in which the tablet 1 is horizontally placed in the cradle 2.

By such a structure, the terminal 25T of the connector is inserted into the connector hole 13, and the tip of the lock arm 24 comes into contact with the edge portion of the engagement holes 12, and thereby the lock arm 24 rotates toward the positioning protrusion 23, if the engagement holes 12 of the tablet 1 are combined with the two positioning protrusions 23 of the cradle 2. If the tablet 1 is completely combined with the cradle 2, the lock arm 24 is rotated by the spring 24B, and a hook portion adjacent to the slope surface of the tip of the lock arm 24 is fitted to the engagement wall 14 in the edge portion of the engagement holes 12. FIGS. 7A and 7B illustrate a state in which the hook portion following the slope surface of the tip of the lock arm 24 is fitted to the engagement wall 14 in the edge portion of the engagement hole 12. If the tablet 1 is removed from the cradle 2, the two lock arms 24 may be rotated toward the positioning protrusion 23 side by a lever, but the lever is not illustrated.

Figure 8A:
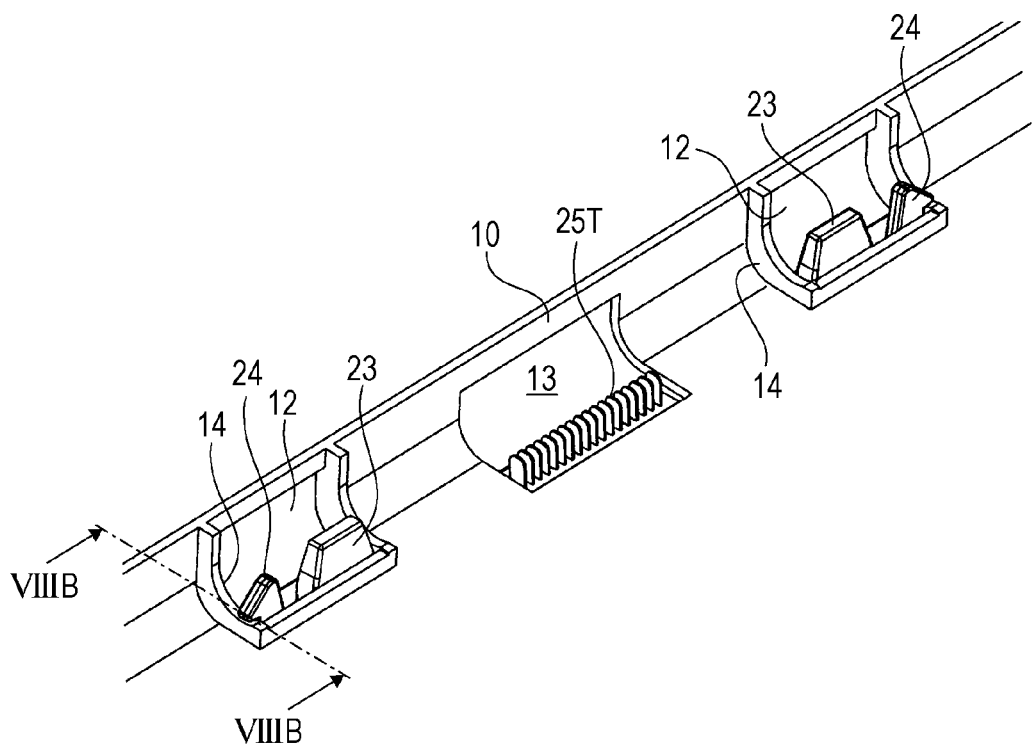
FIG. 8A is a partially enlarged and exploded perspective view which is obtained by viewing a state of the connectors when the tablet is horizontally placed in the cradle illustrated in FIG. 4, from an internal side of a case of the tablet.
Figure 8B:
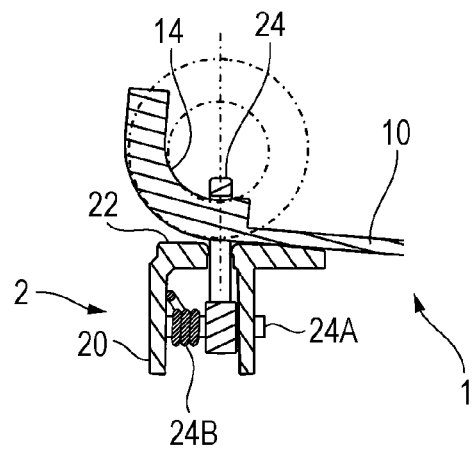
FIG. 8B is a sectional view taken along line VIIIB-VIIIB of FIG. 8A.

FIG. 8A is a figure which is obtained by viewing the positioning protrusion 23 of the cradle 2, the lock arm 24, and the terminal 25T from an internal side of the case 10 of the tablet 1, when the tablet 1 is horizontally placed in the cradle 2 illustrated in FIG. 4. In addition, FIG. 8B illustrates a cross section taken along line VIIIB-VIIIB of FIG. 8A. In the tablet 1, only a state in which the engagement holes 12 and the connector hole 13 of the case 10 are viewed from an internal side is illustrated, and connectors in the tablet 1 are not illustrated.

If the tablet 1 is horizontally placed in the cradle 2 and the engagement holes 12 of the tablet 1 are combined with the two positioning protrusions 23 of the cradle 2, the position of the engagement holes 12 is corrected as described above, and the position of the tablet 1 with respect to the cradle 2 is determined. Thereafter, the terminal 25T of the connector is inserted into the connector hole 13, the slope surface of the tip of the lock arm 24 comes into contact with the edge portion of the engagement holes 12, and the lock arm 24 rotates toward the positioning protrusion 23. If the tablet 1 is completely combined with the cradle 2, the lock arm 24 is rotated by the spring 24B, and the hook portion in contact with the slope surface of the tip of the lock arm 24 is fitted to the back light panel 14 in the edge portion of the engagement holes 12. FIGS. 8A and 8B illustrate a state in which the hook portion is combined with the engagement wall 14 in the edge portion of the engagement hole 12 following the slope surface of the tip of the lock arm 24.

Figure 1A:
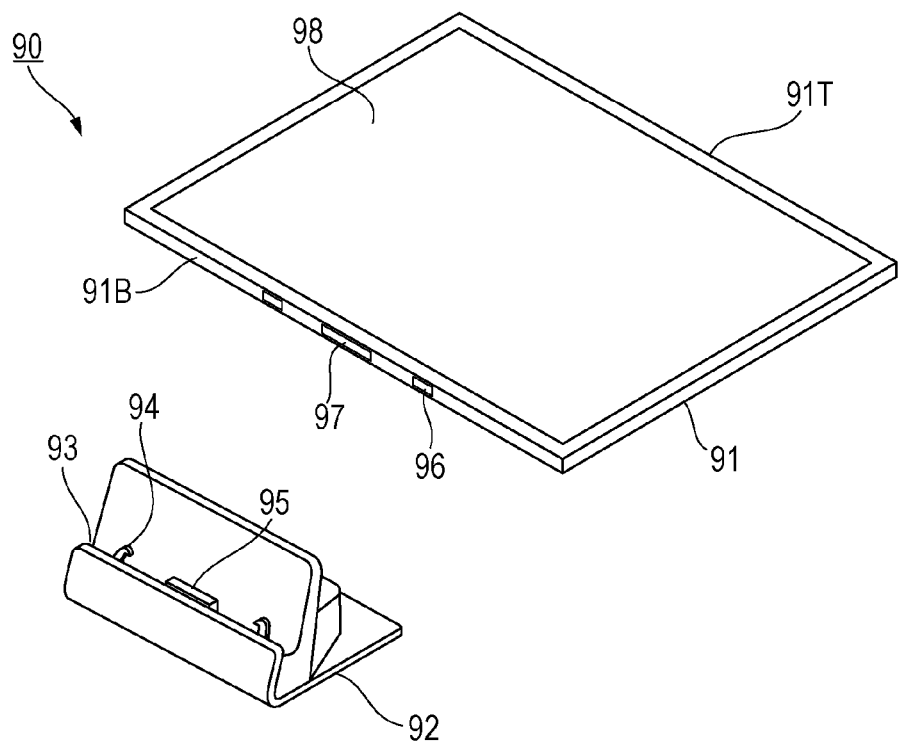
FIG. 1A is a perspective view of an electronic apparatus including a tablet and a cradle for vertical placement.
Figure 1B:
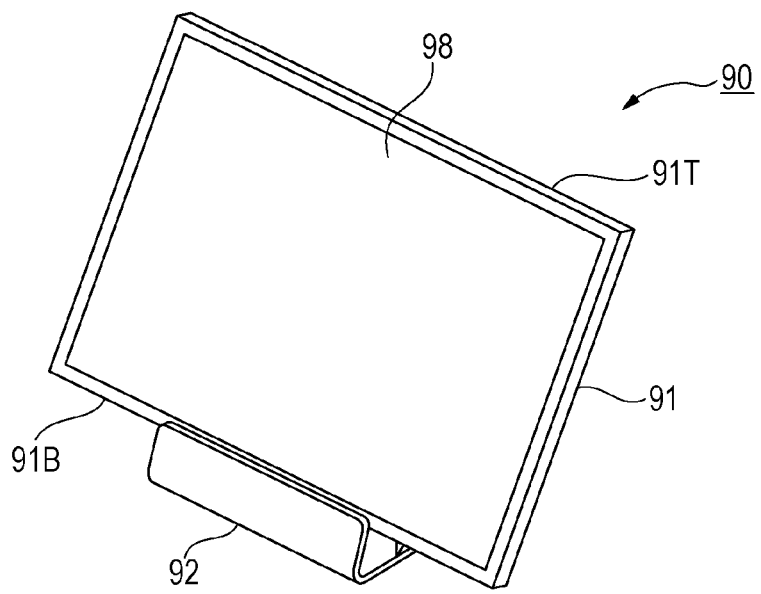
FIG. 1B is a perspective view illustrating the electronic apparatus in which the tablet is held in an obliquely upright state in the cradle illustrated in FIG. 1A.
Figure 2A:
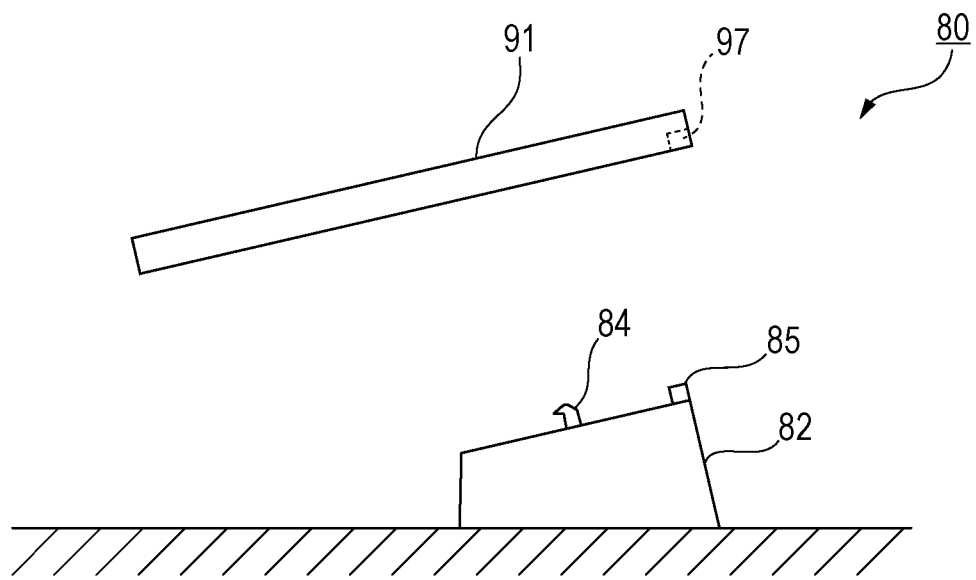
FIG. 2A is a side view of an electronic apparatus including a tablet and a cradle for vertical placement.
Figure 2B:
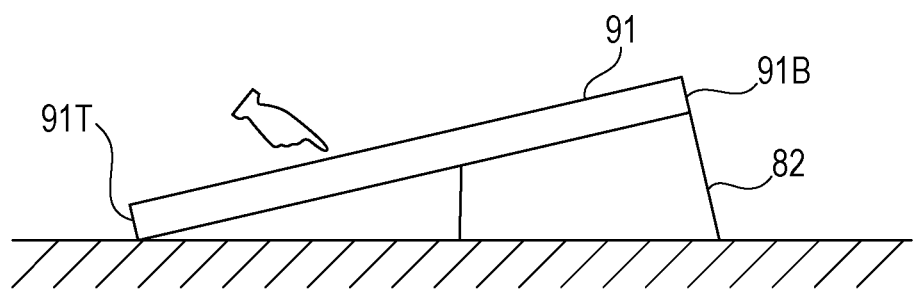
FIG. 2B is a side view illustrating the electronic apparatus in which the tablet is held approximately horizontally in the cradle illustrated in FIG. 2A.
Figure 3A:
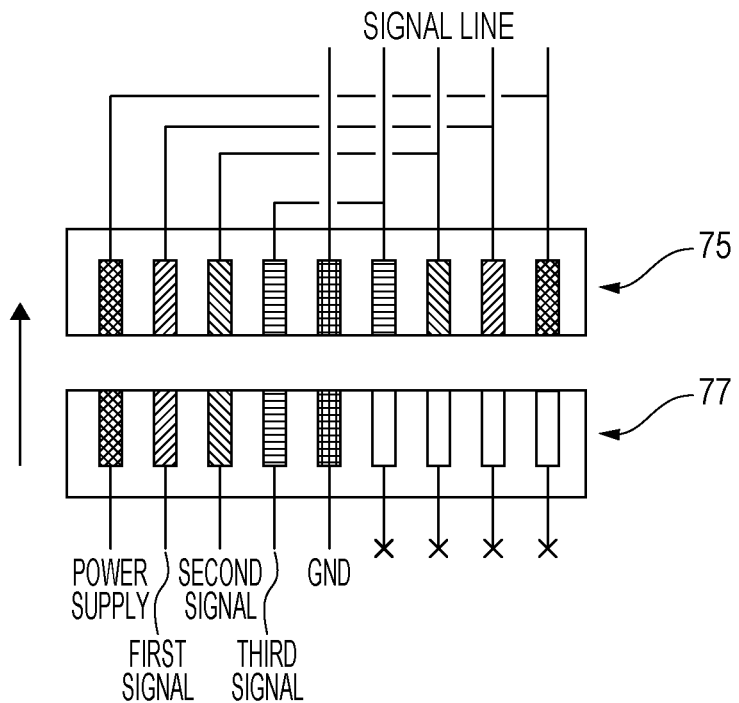
FIG. 3A illustrates arrangement of terminals of cradle side connector and tablet side connector, and a signal line according to a comparative technology, when the tablet is vertically placed in the cradle.
Figure 3B:
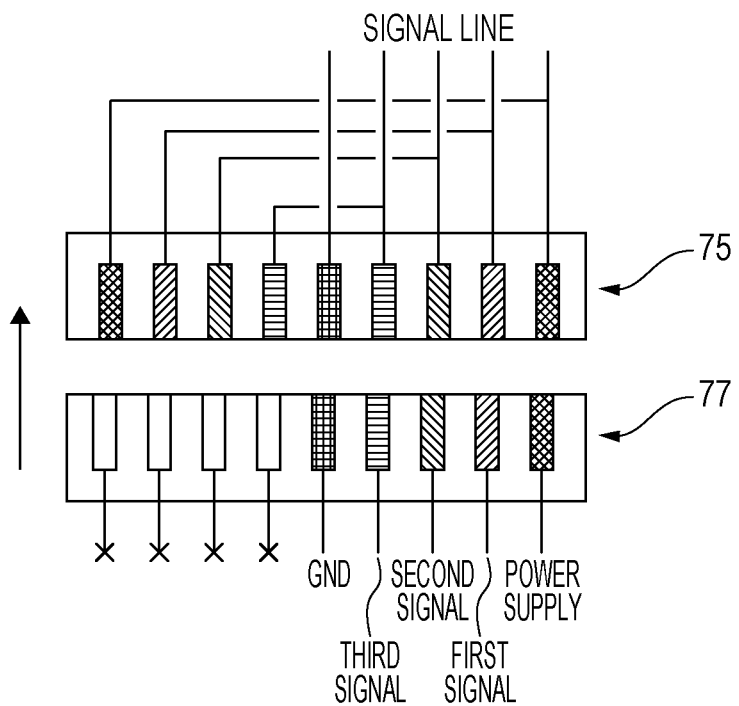
FIG. 3B illustrates arrangement of terminals of cradle side connector and tablet side connector, and a signal line according to a comparative technology, when the tablet is horizontally placed in the cradle.

As described above, in a case in which the tablet 1 is vertically placed in a cradle 2, and in a case in which the tablet 1 is horizontally place in a cradle 2, the left and the right of the terminal 11T of the connector 11 are reversed from each other. In a case in which a cradle of one type is prepared for the tablet 1 which may be vertically placed and horizontally placed, for example, a connector 75 on the cradle side and a connector 77 on the tablet side may be disposed as illustrated in FIGS. 3A and 3B. That is, if the number of terminals is odd, the central terminal may be commonly used as a ground terminal, unused terminals denoted by X may be provided in the connector 77 on the tablet side, and terminals of the same number may be disposed in reverse order on both sides of the central terminal in the connector 75 on the cradle side.

However, if the connector 75 on the cradle side and the connector 77 on the tablet side are disposed as illustrated in FIGS. 3A and 3B, there are problems in which the number of terminals increases, the space is widened, and cost also increases. In the present disclosure, a switching switch is provided in a circuit which is connected to the connector the connector 25 of the cradle 2, and thus the problems in which the space is widened and cost increases is solved. A circuit according to one example will be described with reference to FIGS. 9A and 9B.

Figure 9A:
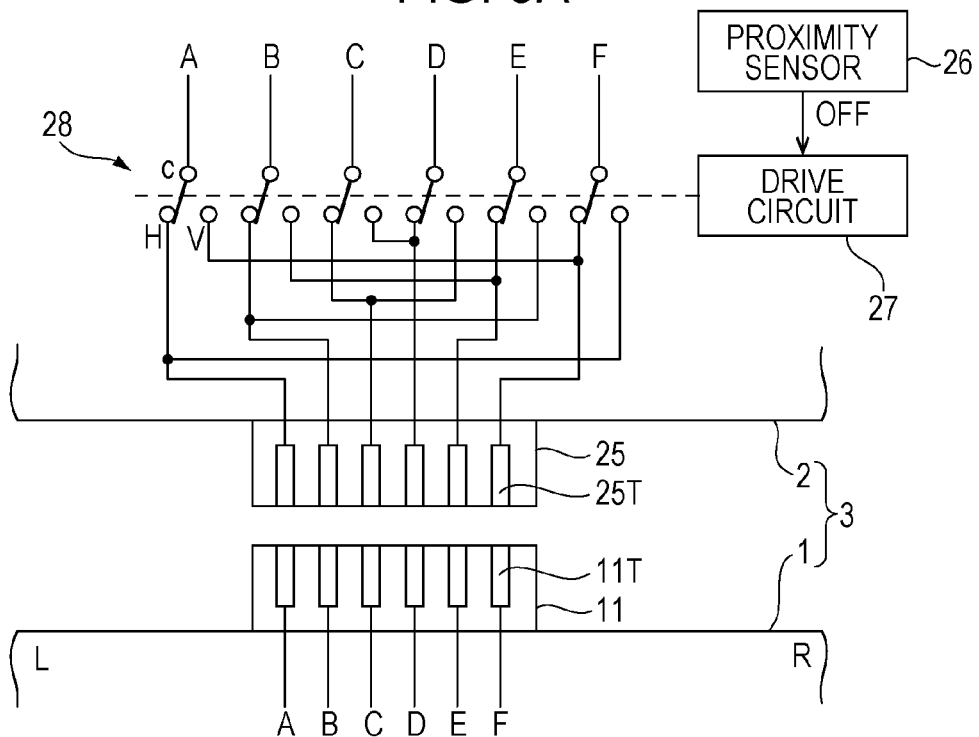
FIG. 9A is a circuit diagram according to a first example illustrating a state of terminal switching switches on a cradle side when a proximity sensor provided in the cradle is turned off.

FIG. 9A illustrates a circuit which is connected to the connector 25 of the cradle 2. For the sake of a brief description, it is assumed that there are six terminals 25T in the connector 25, and there are also six terminals 11T on the connector 11 of the tablet side which is connected to the connector 25. Then, it is assumed that six signals A, B, C, D, E, and F are input to the cradle 2 from the tablet 1 by the connectors 11 and 25. The six signals A, B, C, D, E, and F are sequentially output from the terminal 11T of the connector 11.

In the present example, a six-pole double throw switch in which six one-pole double throw switches are connected in parallel with each other, is provided in the cradle 2 as switching switches 28. Then, contact points H of a plurality of two switching contact points (these are referred to as a contact H and a contact point V) are sequentially connected to the terminal 25T of the connector 25 through signal lines, in such a manner that six signals A, B, C, D, E, and F are sequentially output from six contact points c of the switching switches 28. In addition, the contact points V are sequentially connected to the terminal 25T of the connector 25 in a reverse direction.

The switching switches 28 are switched by a drive circuit 27, and the drive circuit 27 is connected to the proximity sensor 26 provided in the cradle 2. Then, when the proximity sensor 26 is turned off (when the tablet 1 is horizontally placed), the contact points H are connected to the contact points c by the drive circuit 27. In addition, when the proximity sensor 26 is turned on (when the tablet 1 is vertically placed), the contact points V are connected to the contact points c by the drive circuit 27, as illustrated in FIG. 9B.

As a result, in a state in which the tablet 1 is horizontally placed in the cradle 2 as illustrated in FIG. 9A, the proximity sensor 26 is turned off, and the contact points c of the switching switches 28 are connected to the contact points H by the drive circuit 27. For this reason, if the connector 11 is connected to the connector 25, the six signals A, B, C, D, E, and F which are sequentially output from the left of the terminal 11T of the connector 11 are input to the contact points H of the switching switches 28, and are output from the contact points c of the switching switches 28 in this order.

Figure 9B:
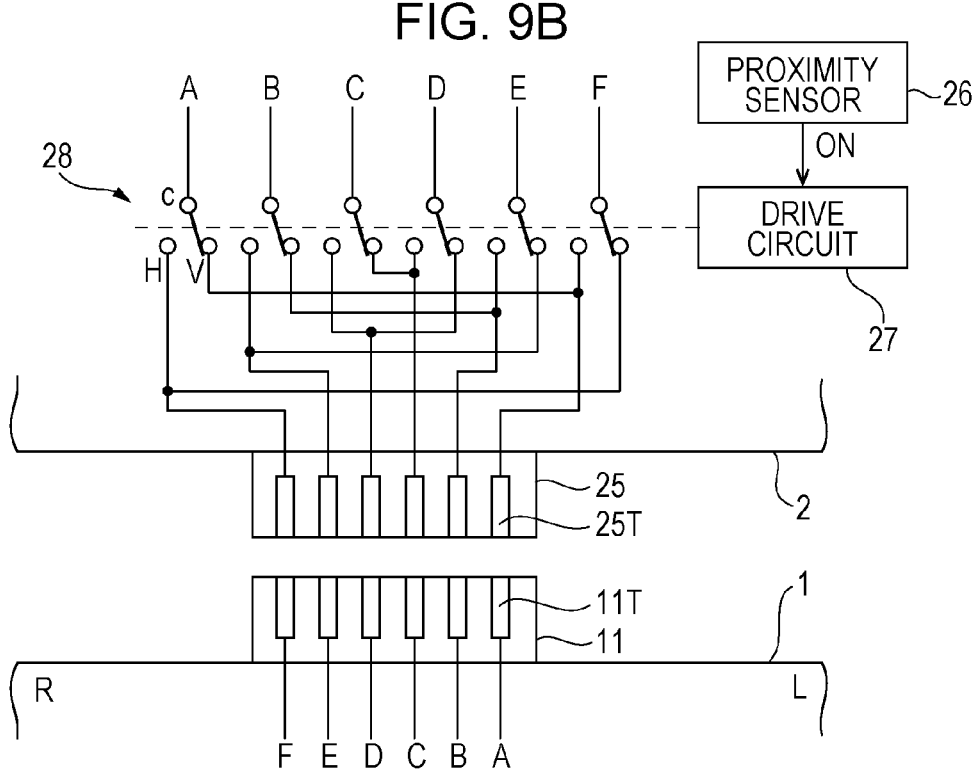

Meanwhile, in a state in which the tablet 1 is vertically placed in the cradle 2 as illustrated in FIG. 9B, the proximity sensor 26 is turned on, and the contact points c of the switching switches 28 are connected to the contact points V by the drive circuit 27. At this time, the left and the right of the tablet 1 are reversed, compared to a case in which the tablet 1 is horizontally placed in the cradle 2 as illustrated in FIG. 9A. For this reason, if the connector 11 is connected to the connector 25, the six signals F, E, E, C, B, and A which are sequentially output from the left of the terminal 11T of the connector 11 are input to the contact points V of the switching switches 28, and are output from the contact points c of the switching switches 28 in reverse order. Thus, the same signals as those when the tablet 1 is horizontally placed in the cradle 2 are output from the contact points c of the switching switches 28.

In this way, in an electronic apparatus 3 according to the present example, the switching switches 28 are switched by the proximity sensor 26, even in a case in which the tablet 1 is vertically placed in the cradle 2, or even in a case in which the tablet 1 is horizontally place in the cradle 2, and thus the outputs from the switching switches 28 are the same as each other in any state. Thus, the terminals of the connectors 11 and 25 which are provided in the tablet 1 and the cradle 2 do not have to be disposed in two columns or twice, the connectors may be miniaturized, and the sizes of the tablet 1 and the cradle 2 may be reduced.

Figure 10:
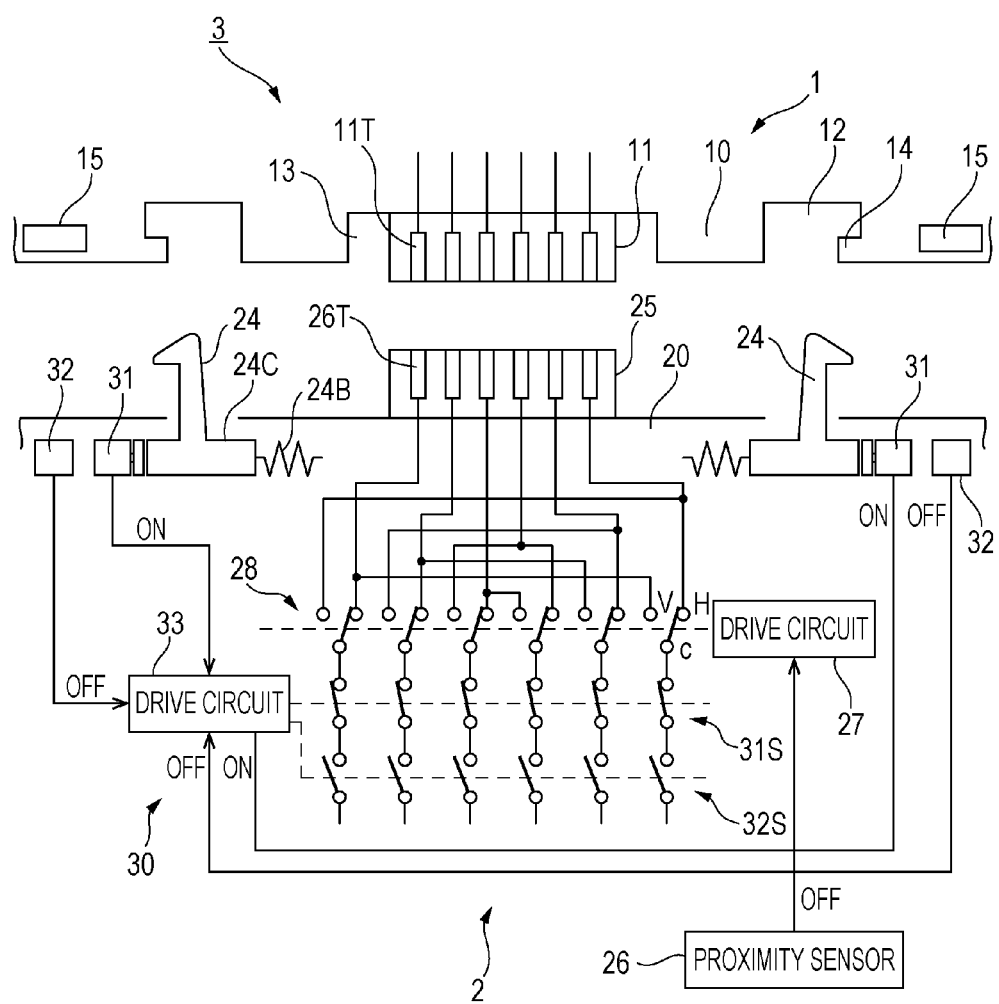
FIG. 10 is a circuit diagram according to a second example illustrating a state of two switches for detecting a coupling state of a tablet and switches provided on a cradle side, when the tablet is not connected to the cradle.

FIG. 10 illustrates a circuit according to a second example in which signals are transferred from the tablet 1 side to the cradle 2 side through connectors 11 and 25, in a state in which the tablet 1 is locked with respect to the cradle 2 by the lock arm 24 provided in the cradle 2. In the second example, it is possible to reduce a connection failure of the connectors 11 and 25 occurring when the tablet 1 is not locked with respect to the cradle 2. Here, an operation according to the second example will be described with reference to a case in which the tablet 1 is horizontally placed in the cradle 2.

A circuit according to the second example includes a lock detection circuit 30 in addition to a circuit including the proximity sensor 26 connected to the connector 25 according to the first example, the drive circuit 27, and the switching switches 28. The lock detection circuit 30 is connected to the contact points c of the switching switches 28. In addition, in the cradle 2 which employs the circuit according to the first example, the lock arm 24 is a rotary type, but, in the second example, the lock arm 24 is a slide type in which the lock arm 24 is attached to a movable axis 24C.

The lock detection circuit 30 includes a magnet 15 which is provided in the vicinity of the two engagement holes 12 in the case 10 of the tablet 1, and an MR sensor 32 which is provided in a position facing the magnet 15 of the cradle 2 when the tablet 1 is combined with the cradle 2. The MR sensor 32 is turned on when detecting the approach of the magnet 15. The movable axis 24C which is attached to the lock arm 24 is attached to both end sides (positioning protrusion is not illustrated) of the tablet 1 by the spring 24B, in a state in which the tablet 1 is not combined. Movement of the movable axis 24C which is attached by the spring 24B is stopped, in a state in which a mechanical switch (hereinafter, referred to as a hard switch) 31 fixed to the case 20 of the cradle 2 is turned on.

Meanwhile, when the tablet 1 is combined with the cradle 2, the slope surface of the tip of the lock arm 24 comes into contact with the engagement wall 14 for movement, and thus the movable axis 24C of the lock arm 24 is pressed for being moved and an end surface of the movable axis 24C is separated from the hard switch 31. If the end surface of the movable axis 24C is separated from the hard switch 31, the hard switch 31 is turned on. Outputs of the hard switch 31 and the MR sensor 32 are input to a drive circuit 33.

Two switches of a one-pole single throw type are respectively connected in series to the six contact points c of the switching switches 28. Here, six switches of a one-pole single throw type on a side close to the switching switches 28 is referred to as a first switch 31S, and six switches of a one-pole single throw type connected in series to the first switch 31S is referred to as a second switch 32S. The six switches of a one-pole single throw type in the first switch 31S are all switched on when the hard switch 31 is switched on by the switching switches 28. In addition, the six switches of a one-pole single throw type in the second switch 32S are all switched on when the MR sensor 32 is turned on by the switching switches 28. Here, since a case in which the tablet 1 is horizontally placed in the cradle 2 is described, the proximity sensor 26 is turned off, and the drive circuit 27 connects the contact points c of the switching switches 28 to the contact points H.

In a case in which the tablet 1 is separated from the cradle 2 as illustrated in FIG. 10, the hard switch 31 is switched on, and the MR sensor 32 is turned off. In this state, the first switch 31S is switched on, and the second switch 32S is switched off, by the drive circuit 33.

Figure 11:
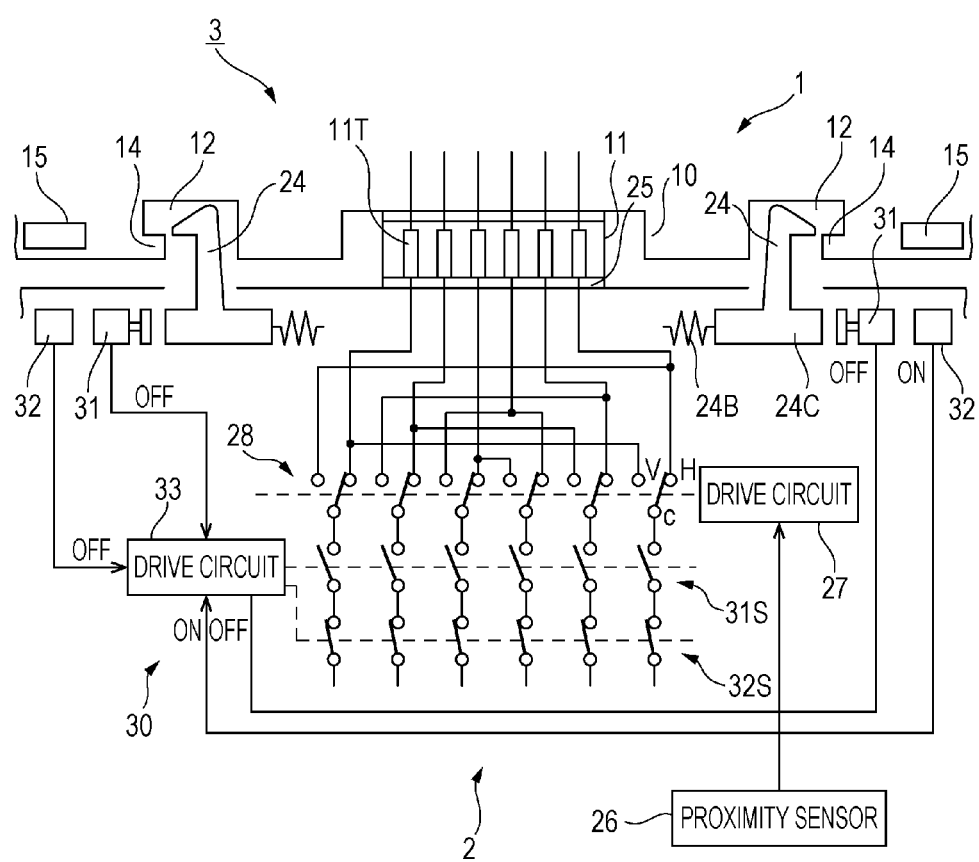
FIG. 11 is a circuit diagram according to a second example illustrating a state of two switches for detecting a state of a combination with a switching switch, in a state shortly before the tablet moves to be coupled to the cradle side from a state illustrated in FIG. 10.

FIG. 11 illustrates a state in which the tablet 1 is in the middle of being combined with the cradle 2. When the tablet 1 is combined with the cradle 2, the slope surface of the tip of the lock arm 24 comes into contact with the engagement wall 14 for movement, and the lock arm 24 is inserted into the engagement hole 12 provided in the case 10 of the tablet 1. During this process, the movable axis 24C of the lock arm 24 presses the spring 24B for movement, and an end surface of the movable axis 24C is separated from the hard switch 31. If the end surface of the movable axis 24C is separated from the hard switch 31, the hard switch 31 is switched on.

Meanwhile, if the tablet 1 approaches the cradle 2, the magnet 15 provided in the case 10 of the tablet 1 approaches the MR sensor 32 provided in the case 20 of the cradle 2, and the MR sensor 32 is turned on. If the hard switch 31 is switched off and the MR sensor 32 is turned on, the first switch 31S is switched off, and the second switch 32S is switched on, by the SRAM 33. Then, the lock arm 24 is inserted into the engagement holes 12 of the tablet 1, and, in a state in which the lock arm 24 does not lock the engagement holes 12, the tablet 1 is not connected to the cradle 2, even though the connector 11 of the tablet 1 is connected to the connector 25 of the cradle 2.

Figure 12:
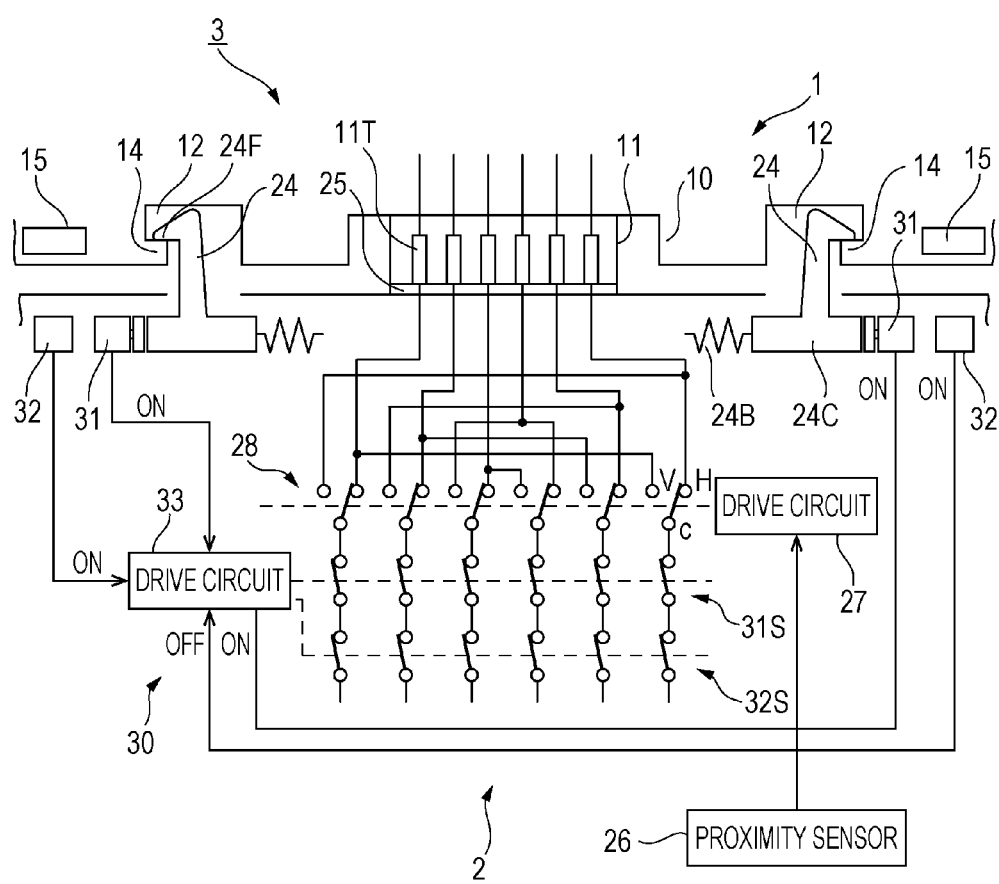
FIG. 12 is a circuit diagram according to a second example illustrating a state of two switches for detecting a state of a combination with a switching switch, in a state in which the tablet further moves to be completely coupled to the cradle side from a state illustrated in FIG. 10.

If the tablet 1 further moves toward the cradle 2 from a state of being illustrated in FIG. 11, the tip of the lock arm 24 goes over the engagement wall 14, as illustrated in FIG. 12. Then, the movable axis 24C moves within the engagement holes 12 in accordance with the biasing force of the spring 24B, and a hook portion 24F in the tip of the lock arm 24 locks the engagement wall 14. In a state in which the hook portion 24F in the tip of the lock arm 24 locks the engagement wall 14, the movable axis 24C comes into contact with the hard switch 31 and turns on the hard switch 31.

In a state in which the tablet 1 is locked with respect to the cradle 2 by the lock arm 24, the hard switch 31 and the MR sensor 32 are turned on together. In a state in which the hard switch 31 and the MR sensor 32 are turned on together, the first switch 31S is switched on, and the second switch 32S is also switched on, by the SRAM 33. As a result, a signal from the tablet 1 is transferred to the inside of the cradle 2 through connectors 11 and 25, the switching switches 28, and the lock detection circuit 30.

In this way, in the circuit according to the second example, a signal from the tablet 1 is not transferred to the cradle 2, in a state in which the tablet 1 is not locked with respect to the cradle 2, and thus it is possible to reduce a connection failure of the connectors 11 and 25.

In the examples described above, the hook portions provided in the tips of the lock arms face directions different from each other, but the hook portions may face the same direction. In addition, the positioning protrusion is inserted into the same engagement hole with the lock arm, but a hole into which the positioning protrusion is inserted may be provided separately from the engagement hole. Thus, an electronic apparatus including the tablet and cradle which have the aforementioned structure may also perform electric charging or data communication depending on a state of use, and it is possible use a method (posture) for placing two tablets in one cradle. In addition, multiple connectors and multiple lock mechanisms do not have to be disposed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic apparatus comprising: a cradle includes a pedestal, a protrusion portion that protrudes toward a slope direction from an upper portion of the pedestal including a slope surface, and a first connector fixedly formed in the pedestal and parallel to a top surface of the pedestal in a horizontal direction; the slope surface and the top surface are in obtuse angle and a display device include a display portion and a second connector formed on a surface of the display device, wherein, even when a back surface of the display device opposed to the display portion comes into contact with the slope surface of the protrusion portion and the display device is mounted on the cradle, the first connector is connected to the second connector, and wherein, even when the back surface of the display device comes into contact with the top surface and the display device is mounted on the cradle, the first connector is connected to the second connector.

2. The electronic apparatus according to claim 1, wherein, when the display device is mounted in a vertically placed manner, the second connector is connected to the first connector in a first direction, and
wherein, when the display device is mounted in a horizontally placed manner, the second connector is connected to the first connector in a second direction different from the first direction.

3. The electronic apparatus according to claim 2, further comprising:
    a detection unit installed in the cradle and to detect that the display device is mounted on the cradle; and
    a switching unit that switches signal lines of connection terminals of the first connector that is connected to the second connector, in accordance with detection results of the detection unit.

4. The electronic apparatus according to claim 3,
wherein the detection unit is a proximity sensor that is formed in a protrusion portion of the cradle, and
wherein the proximity sensor determines whether or not the display device is connected to the cradle in a state of being vertically placed, when an approach of the display device is detected.

5. The electronic apparatus according to claim 4,
wherein when the proximity sensor detects the approach of the display device, the switching unit switches the switch signal lines of the connection terminals of the first connector that is connected to the second connector.

6. The electronic apparatus according to claim 1, further comprising:
    a lock mechanism that locks the display device with respect to both sides of the first connector of the pedestal, when the second connector of the display device is connected to the first connector.

7. The electronic apparatus according to claim 6,
wherein the lock mechanism is including a movable arm that includes a lock arm in a tip, and a biasing member that biases the arm in a direction in which the hook portion is formed, and
wherein a case of the display device includes a lock hole in which an edge portion is stopped by the hook portion, when the lock mechanism is inserted.

8. The electronic apparatus according to claim 7, wherein, when the display device is mounted on the cradle, an internal circumferential surface of an edge portion of the lock hole is formed in an arc shape such that distances from a rotary axis of the arm to the internal circumferential surface are equal to each other.

9. The electronic apparatus according to claim 7, wherein, a protrusion, that is adjacent to the arm and positions the display device when the display device is mounted on the cradle, is formed in the pedestal.

10. The electronic apparatus according to claim 6,
wherein a lock detection unit that detects a lock state controlled by the lock mechanism is formed in the cradle, and
wherein, in a state in which the lock detection unit does not detect the lock state controlled by the lock mechanism, a first switch that disconnects a first connector of the cradle from a signal line connected to a circuit in the cradle is formed so as to be connected with the first connector.

11. The electronic apparatus according to claim 10,
wherein a second detection unit that detects an approach of the display device is formed in the cradle separately from the detection unit,
wherein a second switch is formed in series with the first switch, and
wherein the second detection unit switches off the second switch when the approach of the display device is detected.

12. The electronic apparatus according to claim 7, wherein the arm is a rotary arm that is freely and rotatably supported by a rotary axis, or a slide arm that protrudes from a slide axis.

* * * * *